United States Patent [19]
Omori

[11] Patent Number: 5,107,350
[45] Date of Patent: Apr. 21, 1992

[54] IMAGE READING APPARATUS FOR OPTICALLY READING THE CONTENTS OF A CONVEYED DOCUMENT AND OBTAINING IMAGE SIGNAL INFORMATION

[75] Inventor: Shinichi Omori, Hachioji, Japan
[73] Assignee: Kabushiki Kaisha Toshiba, Tokyo, Japan
[21] Appl. No.: 540,001
[22] Filed: Jun. 19, 1990

[30] Foreign Application Priority Data

Jun. 20, 1989 [JP] Japan ................... 1-157155

[51] Int. Cl.$^5$ .............................................. H04N 1/04
[52] U.S. Cl. .................... 358/461; 358/471; 358/498
[58] Field of Search ............... 358/498, 461, 496, 471, 358/475; 355/213

[56] References Cited

U.S. PATENT DOCUMENTS

| | | | |
|---|---|---|---|
| 3,903,795 | 9/1975 | Suzuki | 101/409 |
| 4,062,021 | 12/1977 | Taylor | 346/136 |
| 4,520,395 | 5/1985 | Abe | 358/163 |
| 4,743,974 | 5/1988 | Lockwood | 358/163 |
| 4,970,606 | 11/1990 | Shima | 358/474 |
| 4,990,764 | 2/1991 | Yokochi et al. | 250/208.1 |

Primary Examiner—Leo H. Boudreau
Assistant Examiner—Andrew W. Johns
Attorney, Agent, or Firm—Finnegan, Henderson, Farabow, Garrett, and Dunner

[57] ABSTRACT

An image reading apparatus in which a document conveying roller is provided on one surface side of a transparent member provided on a document conveying path and at least one light source is provided on the other surface side of the transparent member to direct light to the document through the transparent member while being conveyed along the transparent member and light-receiving elements receive light, which is reflected from the document, so as to read out document information. In the image reading apparatus, in order to eliminate a variation in the detection output of the reflected light resulting from a variation in the detection characteristic of the light-receiving element, the roller for document conveyance is white and the light reflected from a roller area is detected by the light-receiving elements to obtain a signal as a reference white level signal. A plurality of unenlarged white sections are provided on the roller and do not contact with the transparent member and document during the conveyance of the document past the roller to keep the roller clean. It is thus possible to obtain a stable reference white level signal for a prolonged period of time with the use of the light which originates from the light source and is reflected from the unenlarged white sections of the roller.

15 Claims, 11 Drawing Sheets

IMAGE READING APPARATUS FOR OPTICALLY READING THE CONTENTS OF A CONVEYED DOCUMENT AND OBTAINING IMAGE SIGNAL INFORMATION

BACKGROUND OF THE INVENTION

1. Field of the Invention

The present invention relates to an improved image reading apparatus for optically reading the contents of a document being conveyed to obtain corresponding image information.

2. Description of the Related Art

As is well known in the art, a facsimile apparatus comprises a reading device for optically reading an image on a sheet-like document, such as a letter, a picture, a photo, and the like; a conveying mechanism for conveying the document to the reading device; a coding device for converting the image data which has been read by the reading means as an electric signal into digital data and coding it; a transmitter for transmitting the coded data to a transmission path; a receiver for receiving data coming from the transmission path; a decoder for decoding the data which has been received by the receiver into original image data; and a recording device for recording the decoded image data on a recording paper.

When a transmitting-side facsimile apparatus is linked to a receiving-side facsimile apparatus via a transmission path, such as a telephone line, with a document set on the transmitting-side facsimile apparatus, the transmitting-side facsimile apparatus is operated so that the reading device reads out an image on the document being conveyed, the coder encodes digital data to which the read-out data has been converted, and the transmitter transmits the encoded digital data as a modulated signal via the transmission path. In the receiving-side facsimile apparatus, on the other hand, the receiver receives a signal being transmitted over the transmission path, the decoder decodes the coded data which has been modulated back to original image data, and the recorder receives the image data, and records it, as a reproduced image on a recording paper sheet.

Such conventional facsimile apparatus can treat any document as transmitted image data and transmit any imageable information, such as a printed character and a picture, a photo, a hand-written character and a picture, or the like.

A general arrangement of a conventional facsimile apparatus will be explained below with reference to FIG. 12.

As shown in FIG. 12, a housing 1 for a facsimile apparatus has a document insertion inlet 1a for setting a document on a proper location, a document delivery outlet 1b and a recording sheet outlet 1c. A document rest 10 is provided relative to the document insertion inlet 1a to allow the document whose image is to be transmitted to be held in place at a slanted angle. The document is set on the document rest 10 with its forward end slantwise placed in contact with a guide 9a in the housing 1. The guide 9a is located opposite to a guide 9b so that the document can be guided over a feed roller 3 past a location between these guides. The feed roller 3 is located below and in contact with the guide 9a.

Upon setting a plurality of sheet-like documents on the document rest 10, superimposed documents have their forward ends obliquely rearranged so that the bottommost document first reaches a nip between the feed roller 3 and the guide 9a. Since only the bottommost document directly contacts with the feed roller 3, the bottom most document is fed downstream of a delivery path with the rotation of the feed roller 3.

A pair of feed rollers 4a, 4b are situated downstream of the feed roller 3, followed by a roller 5 and an imager system 8. Of these rollers, the rollers 4a and 4b are a drive roller and pinch roller, respectively. The rotational speed of the roller 4a is set to be faster than that of the roller 3 and thus a preceding document is fed faster than a following document. As a result, even if a plurality of documents are set, on over another, one the document rest 10, they are fed at proper intervals to the imager system 8 in a sheet-by-sheet fashion. The roller 5 is so arranged as to be in contact with the surface of the imager system 8. The roller 5 is rotated at the same rate as the second feed roller 4a so that the feeding document is fed toward the downstream side while being in firm contact with the imager system 8. Downstream of the imager system 8 are provided a pair of rollers 6a, 6b through which the document which has been read out by the imager system 8 passes. The document then is discharged toward the document delivery outlet 1b. A sensor 7 is located near the document insertion inlet 1a in the housing 1 to detect the presence of a document DP. When the document DP is detected by the sensor 7, then the facsimile apparatus enters a stand-by state is started. The aforementioned arrangement is generally required to read out the document so that image data may be obtained.

The facsimile apparatus includes a printing unit 12 for recording the image data on a recording paper sheet, a roller 11 for discharging the recording sheet 13 toward the corresponding delivery outlet 1c, and so on. Also required are a circuit unit for control, a control unit for communication and transmission, a display, various types of keys, various types of indicator lamps, etc., but they are omitted for the sake of brevity.

FIGS. 13 and 14 are a front view and side view, respectively, showing an image reading apparatus for document readout on the facsimile apparatus.

The image reading apparatus as shown in FIGS. 13 and 14 is composed of the roller 5 and imager system 8 of FIG. 12. Stated in more detail, as shown in FIGS. 13 and 14, a pair of paper guides 101 and 102 for document guide are arranged in a vertical positional relation with an elongated slit 103 formed in the lower paper guide 102 in a direction perpendicular to that in which the document is conveyed.

A transparent plate-like stage 104, such as a glass plate, is located in the slit 103. A light source 105, a lens 106 and a light-receiving sensor 107 are provided below the paper guide 102, and the roller 5 is disposed above the stage 104. The roller 5 is located along a direction perpendicular to that in which the document is conveyed and has a length large enough to cover the width of a document of a largest size handled on the facsimile apparatus. The roller 5 is located in contact with the stage 104 and rotatably supported by a pair of roller support members 109a, 109b at both the ends. The roller support members 109a and 109b are mounted, for example, on a paper guide 102.

The roller 5 is made of, for example, a white-color rubber or resin and used for a reference white-color level. The roller 5 is rotated by a motor, not shown, and can be utilized as a roller for conveying a document as already set out above.

As shown in FIG. 14, the document DP is fed into a site between the paper guides 101 and 102 in a direction as indicated by an arrow in FIG. 14 so as to read out the document image on the reading apparatus. Since the roller 5 is rotated in a direction as indicated in FIG. 14, the document DP is fed past a site between the stage 104 and the roller 5, during which the document DP is conveyed along the stage 104 while being pressed by the roller 5, against the stage 104. A light beam coming from a light source 105 illuminates the document DP through the stage 104 and the reflected beam is imaged at a light-receiving sensor 107 via a lens 106. Thus, the information of the document DP is detected by the sensor 107 as an amount of light reflected and converted to an image signal (an analog signal). In this way, it is possible to read out the information from the document DP.

The imager system 8 uses, as an imaging sensor, a line type light-receiving sensor composed of a CCD (charge coupled device), the arrangement of which is as shown in FIGS. 15 and 16. FIG. 15 is a side view in cross-section showing a pole-like light source 81, a rod lens 84 and at least one light-receiving sensor 86 in a housing 85. The light source 81, rod lens 84, and sensor 86 correspond to the light source 105, lens 106 and sensor 107, respectively, of FIG. 13. A window 83 is provided in the housing 85 and the rod lens 84 and light source 81 are located in the housing 85 such that they face the window 83. A light beam coming from the light source 105 is directed to a roller 5 side through the window 83. A light beam which is reflected from a document being moved beneath the roller 5 is imaged at the light-receiving sensor 86 by the rod lens 84. The sensor 86 is composed of a line-type CCD with a plurality of very tiny light-receiving cells densely arranged, as arrays, in a direction in which the rod lens 84 is situated. An electric signal corresponding to an amount of light detected at the cell array is taken out through a connector 89.

The stage 104, though not shown in FIG. 15, is provided at the location of the window 83.

The light-receiving sensor 86 is composed of arrays 91, 92, 93, 94, . . . , constituted by approximately a few tens to a few hundred of light-receiving cells as shown in FIG. 16. As will be readily understood from the above, image data at each position on the same line of a document can be obtained by controlling the detection timing, etc., of a light-receiving signal which is obtained from the corresponding array so as to handle a displacement from array to array.

In the facsimile apparatus, the roller 5 is white in color and, as shown in FIG. 14, the reference white level of the document DP is set by reading out the white-color surface of the roller 5 by the sensor 86 before the document DP reaches a read position. The imager system 8 utilizes the line-type light-receiving sensor 86 where a plurality of very tiny light-receiving cells are densely arranged in a linear fashion to obtain a space-division resolution.

Since the cells are formed as a semiconductor device, each cell varies in its output characteristic against its input and in its characteristic against a temperature variation and against a variation with time. In order to obtain the accuracy of imaging data output from the respective cells, it is necessary to correct the output level of the respective cells in accordance with a constantly varying output characteristic of the cell.

For such a level correction, it is necessary to know a reference white level.

In order to gain the white-level data, the white-color roller 5 is employed in the image reading apparatus for the facsimile apparatus. A light beam which is reflected on the white-color roller 5 is detected by the respective cells of the imager system 8. The signal level thus detected is utilized as a reference white-color level upon the reading of the document image. Further, the roller 5 of the image reading apparatus is employed as a roller for feeding the document and rolled in contact with the stage 104 or the document DP at all times during use, so that the contact surface of the roller 5, that is, the entire periphery of the roller 5 is liable to be soiled.

Since the signal level that is obtained from the roller surface is utilized as the reference white-color level, if a signal level reflected from a soiled roller is used, it contains a broader soil area a or a local soil area b, as shown in FIG. 17, thus making it difficult to obtain a stable white-color reference signal.

In the conventional image reading apparatus, the reference white-color level of the document is obtained by using the light beam which is reflected from the white-color roller 5 for document feed and for ensuring firm contact of the document with the stage 104. As the roller 5 contacts with the stage 104 or the document DP over its whole surface during feeding of the document, the roller surface is liable to be soiled, thus causing the reference white-color level to become unstable. In order to avoid this problem, frequent cleaning of the roller 5 and frequent cumbersome servicing are necessary.

SUMMARY OF THE INVENTION

It is, accordingly the object of the present invention to provide an image reading apparatus especially suitable for a facsimile apparatus, which can obtain a stable reference white-color level signal over a prolonged period of time without cleaning a roller which would otherwise be soiled in a shorter period of time due to a direct contact of the roller with transparent member and the document being conveyed.

In order to achieve the aforementioned object, there is provided an image reading apparatus provided on a document conveying path to optically read the contents of a document being conveyed on the path and to obtain image signal information, comprising:

a transparent stage provided on the document conveying path to allow a passage of light;

one rotation roller for document conveyance which is provided on one surface side of the stage to allow the document which is conveyed along the document conveying path to pass therethrough relative to the stage, the rotation roller including a plurality of unenlarged sections having a white-color surface and not contacting with the stage and document during the conveyance of the document past the roller;

at least one light source provided on the other surface side of the stage to illuminate the document conveying path through the stage;

at least one light-receiving sensor provided on the other surface side of the stage and adapted to detect light which is directed from the light source to the path and reflected from a roller area on the path and convert document image information to an electric signal;

a sensor for detecting the presence or absence of the document being conveyed toward the stage; and correction means for picking up, as a reference white-color level signal, an output signal which is obtained from the light-receiving sensor in an intervening time interval before the sensor for document detection detects the document and for level-correcting the output signal of the light-receiving sensor.

According to the present invention, the roller is so shaped as to have unenlarged white-color sections in a stepped structure which do not contact with the transparent stage during the conveyance of the document past the roller. This specific roller configuration keeps its unenlarged white-color sections clean and white at all times for a prolonged period of time.

The light that originates from the light source illuminates the document conveyance path through the stage, that is, the light illuminates the roller when the document is not conveyed past the roller and the light illuminates a document when the document is conveyed past the roller. Of those light beams reflected back from the document conveying path, that light beam coming from the roller area in particular is detected, by the sensor, as an electric signal corresponding to the image information of the document. A detection output of the sensor when the document is not detected by the sensor is received by the correction means to obtain a reference white-color level based on the detection output. Upon the detection of the document by the sensor, the correction means subjects the detection output of the sensor to correction based on the reference level to gain exact document image information.

In this embodiment, the roller structure has the unenlarged white-color sections as set forth above to keep them clean at all times, thus obviating the necessity of doing any frequent roller cleaning, etc. It is thus possible to insure ready maintenance and to obtain better-quality image information.

According to another embodiment of the present invention, there is provided an image reading apparatus provided on a document conveying path to optically read the contents of a document being conveyed on the path and to obtain image signal information, comprising:

a transparent stage provided on and across the document conveying path to allow light to pass therethrough;

one rotation roller arranged on one surface side of the stage to allow the document which is conveyed along the document conveying path to pass therethrough relative to the stage, the roller including a plurality of unenlarged sections having a white-color surface and not contacting with the stage and document during the conveyance of the document past the roller;

at least one light source provided on the other surface side of the stage to illuminate the document conveying path through the stage;

a light-receiving unit including a plurality of very tiny light-receiving elements arranged as a dense array in one direction to convert light to an electric signal, the light-receiving elements being provided on the other surface side of the stage and arranged across the document conveying path to detect light which is directed from the light source to the path and reflected from a roller area on the path;

a sensor for detecting the presence or absence of the document being conveyed toward the stage; and correction means for picking up, as a reference white-color level signal, an output signal which is obtained from the respective light-receiving elements in the unit in an intervening time interval before the sensor for document detection detects the document and for level-correcting the output signal of the light receiving element.

In this embodiment, the roller is stepped so as to provide an enlarged section contacting with the transparent stage during the conveyance of the document past the roller and to provide unenlarged white-color sections not contacting with the stage during the conveyance of the document past the roller. The document is moved past a location between the stage and the outer peripheral surface of the roller at which time the unenlarged sections do not contact with the stage so that the unenlarged sections are kept clean and white at all times.

The light source is provided on an other surface of the stage and directs light toward the document conveyance path through the stage. The optical source illuminates the roller when the document is not moved past the roller and illuminates a document when the document is moved past the roller. The light-receiving unit includes a plurality of very tiny light-receiving elements arranged as a dense array. Of those light beams reflected back from the document conveyance path, that light beam that is reflected from the roller area, in particular, is detected as an electric signal corresponding to the document image information. The correction means receives the detection output of the light receiving elements corresponding to the reflected light upon the detection of the document by the sensor to obtain a reference white-color level based on the detection output of the sensor. Upon the detection of the document by the sensor, the correction means corrects the detection output of the light-receiving elements based on the reference white-color level. By so doing, the correction means corrects a variation in the detection output of the document resulting from a change in the characteristic of the light-receiving elements to accurately obtain document image information.

In this embodiment, the roller has unenlarged sections to prevent them from being soiled. This specific arrangement obviates the need for frequent cleaning of the roller, thus insuring ready maintenance and obtaining better-quality image information.

According to another embodiment, there is provided an image reading apparatus provided on a document conveying path to optically read the contents of a document being conveyed on the path and to obtain image signal information, comprising:

a transparent stage provided on the document conveyance path to allow a passage of light;

one roller for document conveyance which is provided on one surface side of the stage to allow the document which is conveyed along the document conveying path to pass therethrough relative to the stage, the rotation roller including a plurality of unenlarged sections having a white-color surface and not contacting with the stage and document during the conveyance of the document past the roller;

at least one light source provided on the other surface side of the stage to illuminate the document conveying path through the stage; and at least light-receiving sensor provided on the other surface side of the stage and adapted to detect light which is directed from the light source to the path and reflected from a roller area on the path and convert document image information to an electric signal.

In this embodiment, the roller, though contacting with the transparent stage, is stepped so as to have unenlarged white-color sections not contacting with the stage when the document moves past the roller. The roller feeds the document past a location between the stage and the roller at which time the unenlarged sections do not contact with the stage. Therefore, the unenlarged sections are less liable to be soiled and move likely to be kept clean and white for an extended period of time.

The light source is provided on the other surface side of the stage and illuminates the document conveying path through the stage. That is, the light source illuminates the roller when the document is not moved past the roller and illuminates the document when the document is moved past the roller. Of those light beams reflected back from the document conveyance path, the light beam that is reflected from the roller area, in particular, is picked up as an electric signal corresponding to document image information. The detection output of the light receiving elements when the document is not fed past the roller is utilized to obtain a reference white-color level because that light beam is reflected from the roller.

Using the detection output of the reflected light coming from the document, as a reference level for correction, in order to obtain document image information, a variation in the detection output of the document resulting from a variation in the characteristic of the light-receiving sensor is corrected, enabling the document image information to be accurately obtained.

This embodiment can achieve the aforementioned advantages as set forth in connection with the preceding embodiments.

According to the present invention there is provided an image reading apparatus provided on a document conveying path to optically read the contents of a document being conveyed on the path and to obtain image signal information, comprising:

a light-receiving unit provided on and across a document conveying path and having a window made of a transparent member to allow a passage of light, a plurality of very tiny light-receiving elements provided inside the window to provide a dense array in one direction, and at least one light source for directing illumination light to an outside through the window, the light-receiving elements being provided across the document conveying path and the light-receiving unit being adapted to detect light which is directed from the light source toward the path and reflected from a roller area on the path; and one roller arranged opposite to a window position of the light-receiving unit to allow the document which is conveyed along the document conveying path to pass therethrough relative to the window, the roller including a plurality of unenlarged sections having a white-color surface and not contacting with the transparent member and document during the conveyance of the document past the roller.

In this embodiment, the window fitted with the transparent member is provided on the document conveyance path. The very tiny light-receiving elements are provided inside the window to convert light to an electric signal. The light source is provided to direct illumination light to an outside through the window. The light-receiving elements are so arranged as to be located across the document conveyance path. Of those light beams directed from the light source and reflected back from the document conveyance path side, that light beam reflected back from the roller area is detected on the image reading apparatus.

The roller is located opposite to the window position of the light-receiving unit and the document is fed past a location between the window and the roller at which time the unenlarged white-color sections of the roller do not contact with the transparent member and document, thus preventing the unenlarged sections from being soiled. This specific roller structure eliminates the need for frequent cleaning operation which would otherwise be required in the prior art structure. It is thus possible to assure ready maintenance and to obtain better-quality image information.

This embodiment includes the light source, light-receiving unit having the light-receiving elements and stepped white-color roller, and the document is moved into direct contact with the light-receiving unit upon reading information from the document.

According to another embodiment, an image reading apparatus is provided on a document conveying path to optically read the contents of a document being conveyed on the path and to obtain image signal information, comprising:

a light-receiving unit provided on the document conveying path and having a window made of a transparent member to allow a passage of light, a plurality of very tiny light-receiving elements provided inside the window to provide a dense array in one direction, and at least one light source for directing illumination light to an outside through the window, the light-receiving elements being provided across the document conveying path and the light-receiving unit being adapted to detect light which is directed from the light source toward the path and reflected from a roller area on the path;

one roller arranged opposite to a window position of the light-receiving unit to allow the document which is conveyed along the document conveying path to pass therethrough relative to the window, the roller including a plurality of unenlarged sections having a white-color surface and not contacting with the transparent member and document during the conveyance of the document past the roller;

a sensor for detecting the presence or absence of the document being conveyed toward the window; and correction means for picking up, as a reference white-color level signal, an output signal which is obtained from the light-receiving elements in the light-receiving unit in an intervening time interval before the sensor detects the document and for level-correcting the output signal of the light-receiving elements.

In this embodiment, the light-receiving unit includes the window fitted with the transparent member on the document conveying path, very tiny light-receiving elements arranged as a dense array in one direction to convert light to an electric signal, and a light source for directing the illumination light to an outside through the window. Of those light beams directed from the light source toward the document conveyance path and reflected back from the optical path, the light beam reflected from the roller area is detected on the image reading apparatus.

The roller is located opposite the window position of the light-receiving unit and allows the document to be advanced relative to the window position. The roller is stepped so as to have unenlarged white-color sections. The light source illuminates the document conveyance path via the window made of a transparent member. That is, the light source illuminates the roller when the document is not moved past the roller and illuminates the document when the document is moved past the roller. The light-receiving unit has its very tiny light-receiving elements arranged as a denser array in one direction and detects light reflected from the document conveying path, in particular, that light reflected from the roller area, to convert document image information to an electric signal. The correction means receives the detection output of the light-receiving elements corresponding to that reflected light involved when the document is detected by the sensor, to gain a reference white-color level based on the detection output. When the document is detected by the sensor, the correction means corrects the detection output of the light-receiving elements on the basis of the reference level. That is, the correction means corrects a variation in the detection output of the document resulting from a variation in the characteristic of the light-receiving elements to get document image information accurately.

In this embodiment, the roller is stepped so as to have unenlarged white-color sections which do not contact with the transparent member and document during the conveyance of the document past the roller. This roller structure is less liable to be soiled and eliminates the need of effecting any frequent cleaning of the roller, ensuring ready maintenance and obtaining better-quality image information. In this embodiment, the light-receiving unit including the light source and light-receiving elements is so situated as to be in direct contact with the stepped roller. This is the case where the present invention is applied to the apparatus in which the light-receiving unit is so located as to be in direct contact with the document during the conveyance of the document past the roller.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DETAILED DESCRIPTION OF THE PREFERRED EMBODIMENTS

Figure 1:
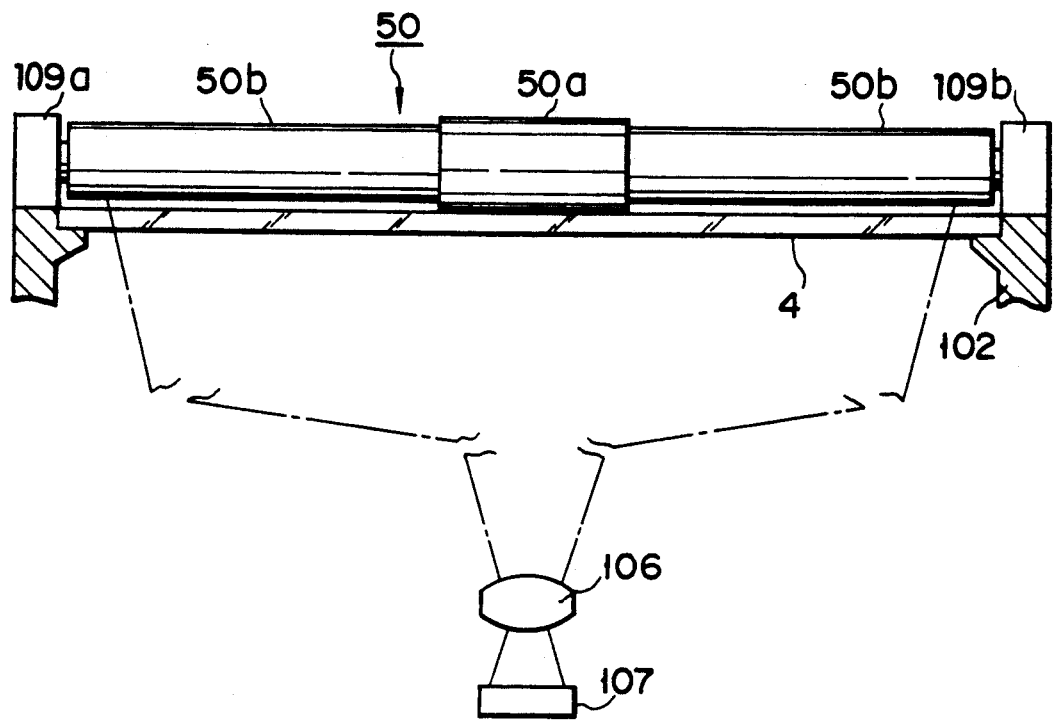
FIGS. 1 and 2 are a front view and side view, respectively, showing a major section of an image reading apparatus according to a first embodiment of the present invention.
Figure 2:
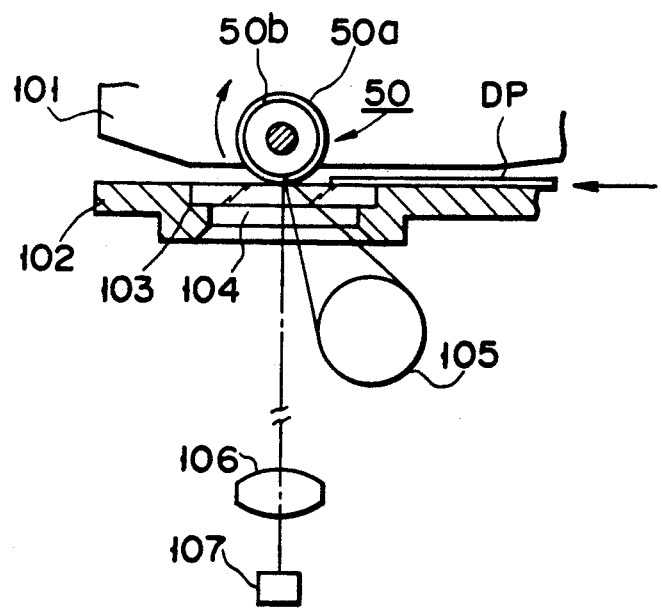

In FIGS. 1 to 3 and 12 to 15, the same reference numerals are employed to designate the same parts or elements throughout. FIG. 1 is a front view diagrammatically showing an essential arrangement of an image reading apparatus according to the present invention and FIG. 2 is a side end view of the image reading apparatus.

In the image reading apparatus as shown in FIGS. 1 and 2, a pair of paper guides 101, 102 are arranged, one over the other, to allow a sheet-like document to be guided. An elongated slit 103 is formed in a direction perpendicular to that in which a document is fed. A transparent sheet-like stage 104, such as a glass plate, is provided in the slit 103. A light source 105, a lens 106 and a light-receiving sensor 107 are provided beneath the paper guide 102 and a roller 50 is located above the stage 104. The roller 50 is oriented in a direction perpendicular to that in which the document is fed, and has a length enough large to cover the width of a largest document handled by on a present facsimile apparatus. The roller 50 is situated so as to be in contact with the stage 104. The roller 50 is held by roller support members 109a, 109b at both ends such that it is rotatable. The roller support members 109a, 109b are mounted, for example, on the paper guide 102.

The roller 50 is made of, for example, a white-color rubber or resin and utilized as a reference white-color level when the document is read. Furthermore as already set forth above, the roller 50 is rotated by a motor, not shown, and used also as a roller for feeding the document. The roller 50 has a middle enlarged section 50a and unenlarged side sections 50b, one at each side of the middle enlarged section to provide a stepped roller structure. In this stepped roller structure, the middle enlarged section 50a alone is in contact with the stage 104 and the document DP and the unenlarged side sections are not in contact with them.

When the document DP is read, it is fed into a location between the paper guides 101 and 102 in a direction as indicated by an arrow in FIG. 2. Since the roller 50 is rotated in a direction as indicated by an arrow in FIG. 3, the document is fed into a nip between the stage 104 and the roller 50. At this time, the document DP is moved over the stage 104 while being pressed by the roller 50 against the stage 104. On the other hand, a light beam coming from the light source 105 illuminates the document being moved on the stage 104 and a light beam reflected from the moving document is imaged at the light-receiving element 107 through the lens 106. By so doing, the document information is detected by the light-receiving sensor 107 as an amount of light reflected and converted to an image signal (an analog signal). In this way, the document information is read out.

Figure 8A:
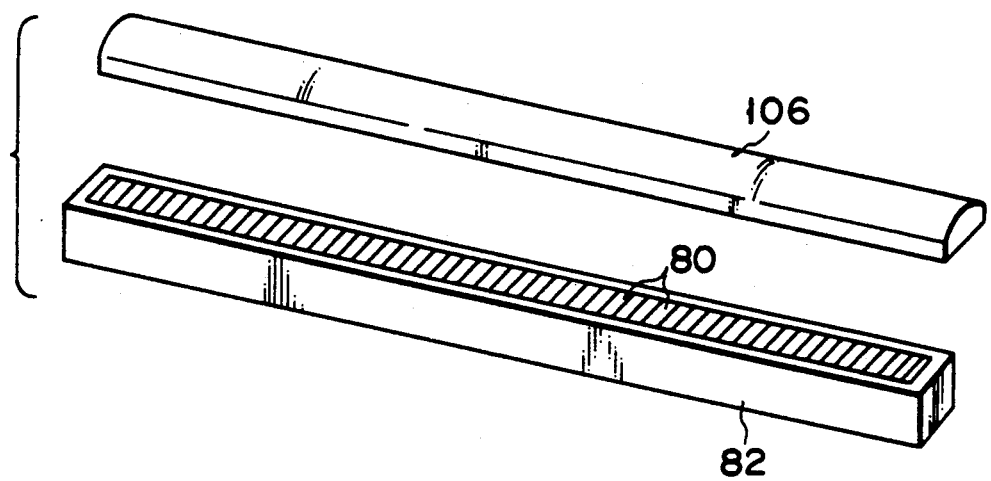
FIGS. 8a and 8b are perspective views showing a practical form of a light-receiving sensor as employed in the present invention.
Figure 15:
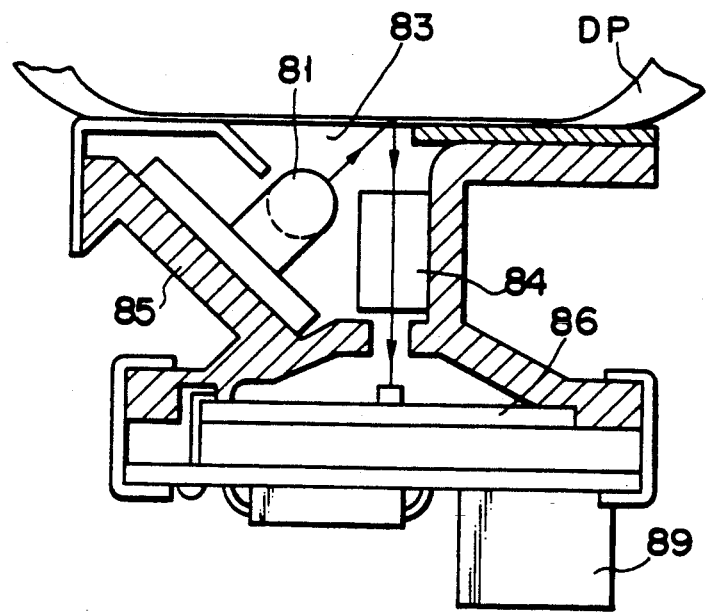
FIG. 15 is a side view in cross-section showing a light-receiving sensor.
Figure 16:
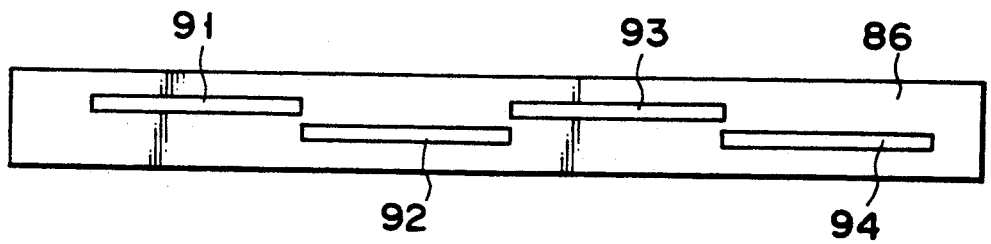
FIG. 16 shows arrays of light-receiving cells in a light-receiving sensor.
Figure 17:
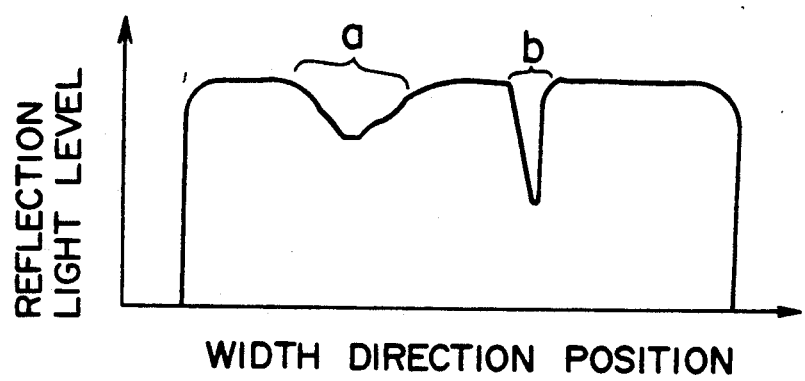
FIG. 17 is a characteristic plot showing a reflection light level of the roller to its width.

An imager system 8 is formed of an imaging sensor, that is, a line type light-receiving sensor using a CCD (charged coupled device), etc., the arrangement of which is as shown in FIGS. 15 and 16. Alternately, an in-line type sensor including a substrate 82 and in-line type dense arrays of very tiny light-receiving cells 80 provided on the substrate, as shown in FIG. 8a, may be used. A light source 105 is provided separately. A rod lens is used as the aforementioned lens 106.

The present invention provides an improved roller (roller 50), not an improvement in the imaging sensor which may be achieved using any conventional image sensor.

Preferably, the imaging sensor is as shown in FIGS. 15 and 16. As shown in FIG. 15, a housing 85 includes a window 83, as well as a rod lens 84 and light source 81, which face the window 83. A light beam originating from the light source 105 is directed toward the rotor 5 side through the window 83. A light beam which is reflected from the rotor 5 side is imaged, by the rod lens 84, at the light-receiving sensor 86. The light-receiving sensor 86 is of a line-type sensor using a CCD and has a structure in which a plurality of very tiny light-receiving cells are closely arranged, as arrays, in a direction in which the rod lens 84 is located. An electric signal corresponding to an amount of light detected by the light-receiving cells is taken out via the connector 89.

Though not shown in FIG. 15, the stage 104 is provided at the location of the window 83.

In the light-receiving sensor 86, arrays 91, 92, 93, 94, ... are composed of approximately a few tens to a few hundreds of light-receiving cells, as shown in FIG. 16. It will be readily appreciated that it is possible to obtain image data of a respective position on the same line on the document by controlling the detection timing, etc., of a reception signal coming from the respective array to handle an array-to-array displacement.

In the image reading apparatus of the facsimile apparatus, as already set forth above, the roller is white in color and the reference white-color level of the document DP is set by reading out the white-color surface of the roller 50, as shown in FIG. 2, before the document DP reaches the read position. There, the imager system 8 employs a line-type sensor 107 where a plurality of very tiny light-receiving cells are densely arranged in a linear array to provide a position division resolution. Since these cells, which are preferably formed as a semiconductor device, vary in the output characteristic against their input and in the characteristic against a temperature variation or against a variation with time, the output level of the respective cells needs to be corrected, in accordance with a change in a constantly variable cell output characteristic, so as to achieve the high accuracy of the imaging data as output from the respective cells.

For level correction, it is necessary to know the reference white-level.

Figure 13:
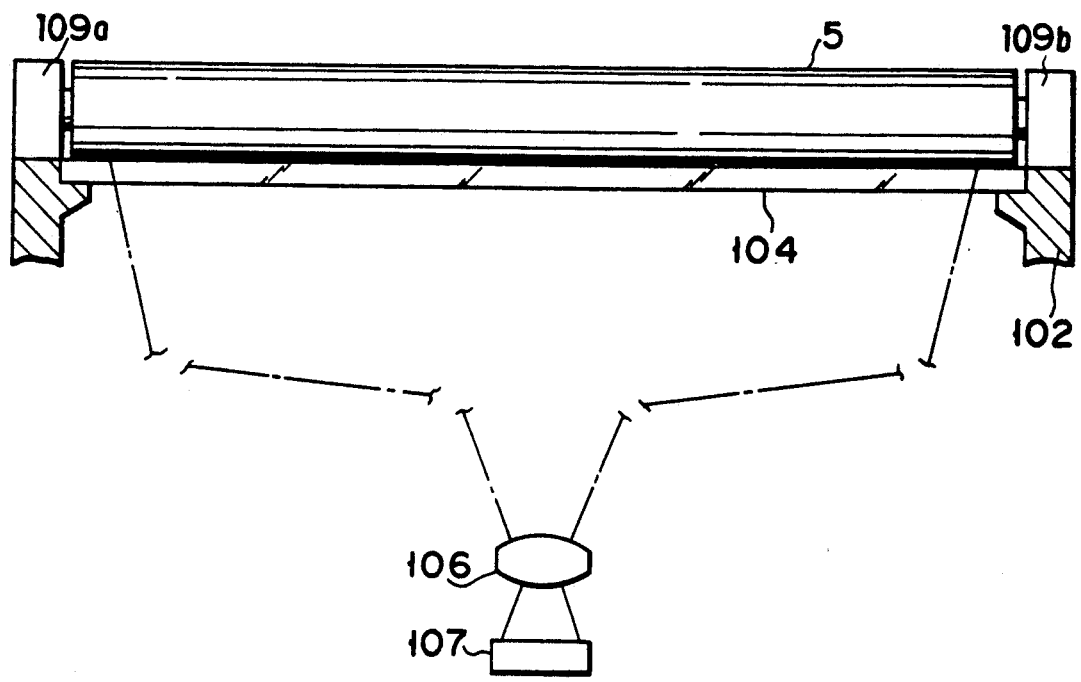
FIG. 13 is a front view showing a major arrangement of a conventional image reading apparatus for a facsimile apparatus.
Figure 14:
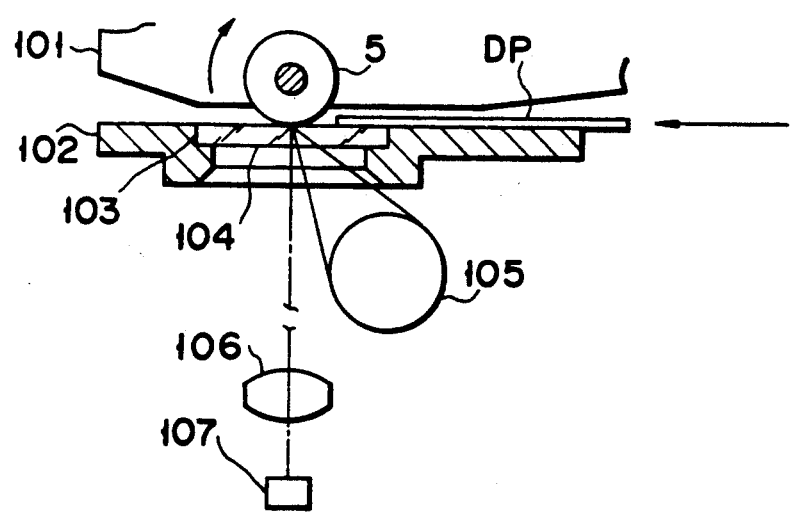
FIG. 14 is a side view showing a major arrangement of a conventional image reading apparatus for a facsimile apparatus.

In the image reading apparatus of the facsimile apparatus, in order to obtain white-color level data, a white-color roller 50 is used and a light beam which is reflected from the white-color roller 50 is detected by the light-receiving cells in the imager system 8. The signal level thus detected is used as the reference white-level. Furthermore, since the roller 5 of the image reading apparatus is also used as a roller for advancing the document, the aforementioned conventional roller 5, which does not have a stepped structure as shown in FIG. 13, has its surface pressed at all times against either the stage 104 or against the document DP, while it is being rotated, so that its contact surface, i.e., its entire peripheral surface is liable to be soiled.

Figure 7A:
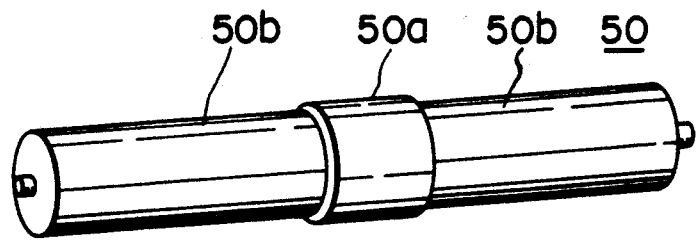
FIGS. 7a to 7e are perspective views showing various forms of roller as employed in the present invention.

In the embodiment shown in FIGS. 1 and 2, however, a roller 50 as shown in FIG. 7a has a middle enlarged section 50a formed as a contact section of a predetermined width and contacts the stage 104. Since the enlarged section is so formed as to be located with an unenlarged sections situated at each side of the enlarged section, only the enlarged section can be brought into contact with the stage 104 and the document DP, and the unenlarged sections of the roller 50 do not contact with the stage 104 and document DP during the conveyance of the document past the roller.

In such a roller structure, the enlarged or contact section 50a serves as a document conveying section and the unenlarged section 50b can be used for a reference white-color level because it tends not to soil during use.

Figure 3:
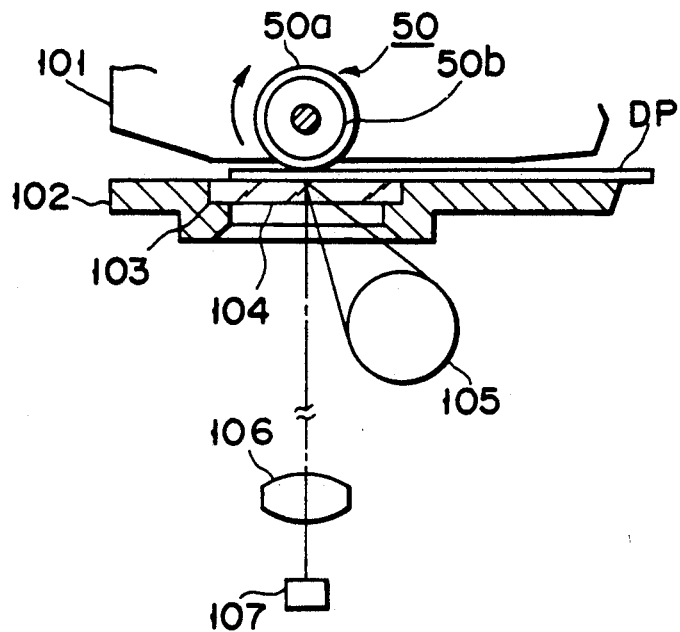
FIG. 3 is a view for explaining the operation of the apparatus shown in FIG. 1.

When the document DP is to be read on the image reading apparatus equipped with the roller 50, it is fed relative to the paper guide 102 in a direction as indicated in FIG. 2 so that it passes through a site between the paper guides 101 and 102. As shown in FIG. 3, the document is moved between the stage 104 and the enlarged section of the roller 50, while being pressed against the stage 104, as the roller 50 is being rotated in a direction as indicated by an arrow in FIG. 3. On the other hand, a light beam is directed from a light source 105 through the stage 104 onto the document DP and a beam reflected from the document is imaged at a light-receiving sensor 107 through a lens 106 to allow information to be read from the document.

Before the document DP reaches a read position, as shown in FIG. 2, a light beam originating from the light source 105 illuminates the surface of the roller 50 to enable the reference white-color level to be read from the roller 50. It should be noted that, since the enlarged section 50a of the roller 50 is rotated while being in contact with the stage 104 or document, it is liable to soil and hence involves less reflectivity. The unenlarged section 50b of the roller 50 does not contact the stage 104 and document DP and, thus is kept clean and white at all times, ensuring a stable reflectivity.

The level of light which is reflected on the unenlarged section 50b of the roller 50, that is, a section of a stable reflectivity, is detected by a sensor 107 as a detection signal. A signal corresponding to a light beam reflected from the enlarged or contact section 50a is complemented by the signal coming from the unenlarged section 50b.

In this way, the reference white-color level can be obtained from the unenlarged section 50b of the roller 50, making it possible to obtain a stable reference white-color level at all times. Thus the image reading apparatus follows either a variation in output light resulting from a possible degradation of the light source 105 or an output variation resulting from a variation in the characteristic of each light-receiving cell in the light-receiving element, enabling image information to be accurately obtained. It is also unnecessary to clean the roller 50 frequently. Further, the middle enlarged section 50a of the roller 50 provides a positive feeding of the document DP.

Figure 5:
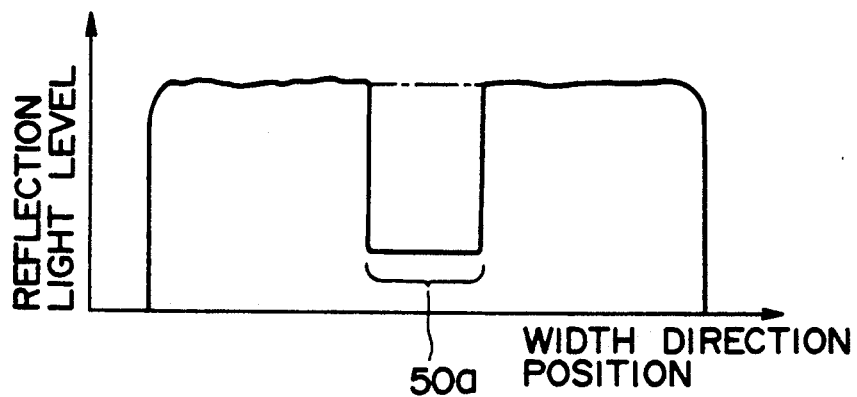
FIG. 5 shows a characteristic plot showing a relation of a reflection light level of the roller of the first embodiment to its width.

FIG. 5 is a characteristic plot showing a relation of an amount of reflected light to the roller 50. This plot is obtained by measuring, along the length of the roller 50, an amount of light received by the light-receiving element 107 when the enlarged section 50a of the roller 50 is formed as a black-colored rubber. As will be appreciated from FIG. 5, a light level is lowered at a zone corresponding to that enlarged section (contact section) 50a of the roller 50 and complemented by a light level corresponding to the unenlarged section 50b of the roller 50 to obtain a reference white-color level as indicated by a dot-dash line of FIG. 5.

The light-receiving element 107 has a positive resolution or a space division resolution and the position of the enlarged section (contact section) 50a of the roller 50 is geometrically determined and can be interpolated. Therefore, it is possible to disregard a signal which is obtained at the enlarged section 50a during the data processing. The enlarged section 50a of the roller 50 is not necessarily required to have a white-color surface and other colors may be utilized for the enlarged section 50a. The unenlarged section 50b of the roller 50 may not have a document feed function. A rubber and/or a resin may be used for the enlarged section 50b.

Figure 4:
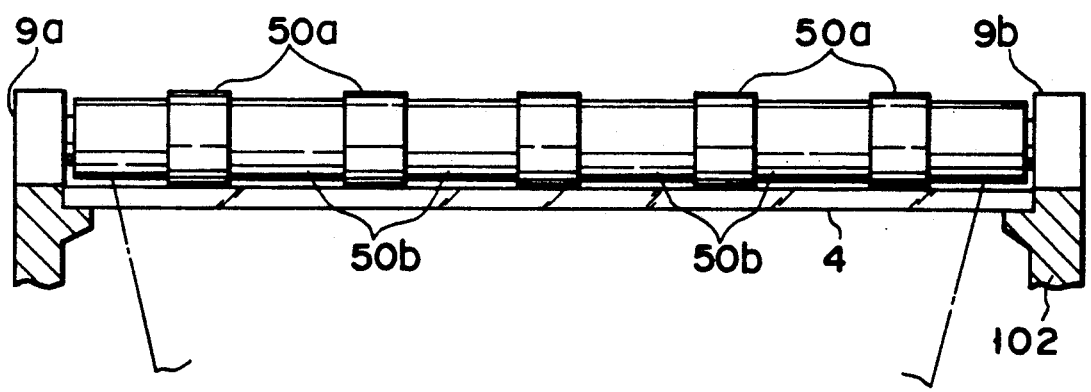
FIG. 4 is a diagrammatic view showing an image reading apparatus according to a second embodiment of the present invention.

FIG. 4 shows another embodiment of the present invention.

Figure 7B:
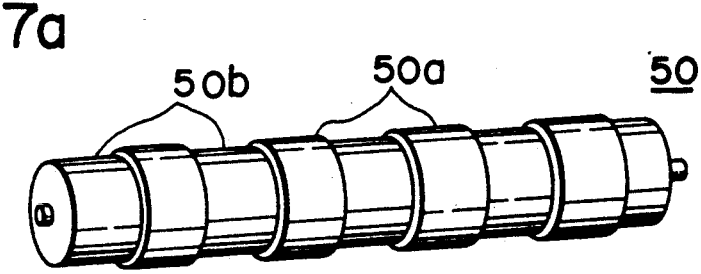

This embodiment includes a plurality of enlarged and unenlarged sections 50a and 50b of narrow width arranged as an alternate array along the length of a roller 50 as shown in perspective view in FIG. 7b. This arrangement can positively feed a document P on respective contact sections 50a of the roller 50 and obtain a stable reference white-color level utilizing a light signal which is reflected from the unenlarged sections 50b of the roller 50.

Figure 6:
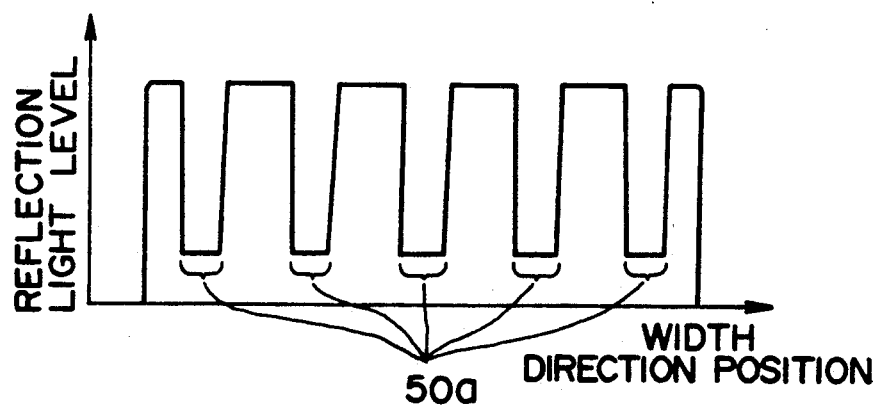
FIG. 6 shows a characteristic plot showing a relation of a reflection light level of the roller of the second embodiment to its width.

FIG. 6 is a characteristic plot showing a relation of an amount of reflected light to the roller 50, indicating that the light levels vary at those zones corresponding to the enlarged and unenlarged sections 50a and 50b of the roller 50 as will be seen from FIG. 6.

Although in the aforementioned respective embodiment the contact sections 50a of the roller 50 have been explained as being in contact with the stage 104, the present invention is not restricted to the aforementioned embodiments. If a structure can convey or feed the document DP, such a structure may be adopted without causing the document to contact with the stage 104, that is, with a gap left between the associated members.

Figure 7C:
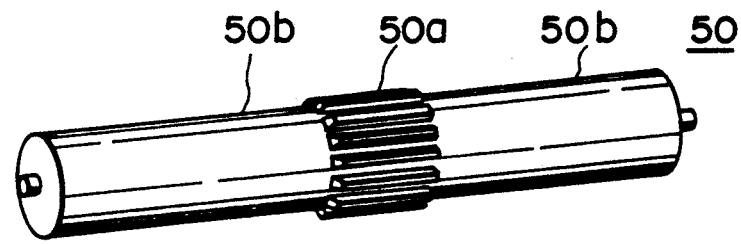
Figure 7D:
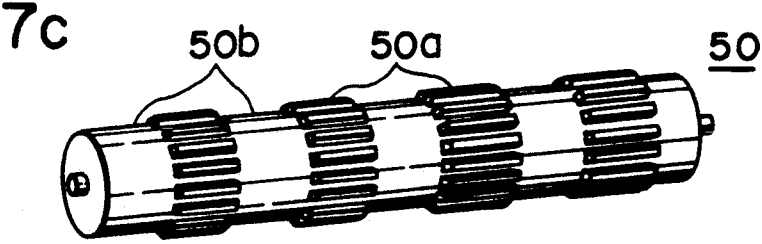
Figure 7E:

For the roller 50, use may be made of a gear-like enlarged section, as shown in FIGS. 7c and 7d, in place of the aforementioned section (contact section) 50a and a multi-fluted roller 50 of a gear-like cross-section as shown in FIG. 7e. The roller 50 as shown in FIG. 7e, makes it is necessary to detect light which is reflected from the valley of the multi-flute roller 50 and to collect a reference white-color level.

As the aforementioned image reading apparatus, various types of imaging devices may be used, such as a type utilizing an optical system for scaling up or down the image of a document or a denser type image sensor.

Figure 8B:
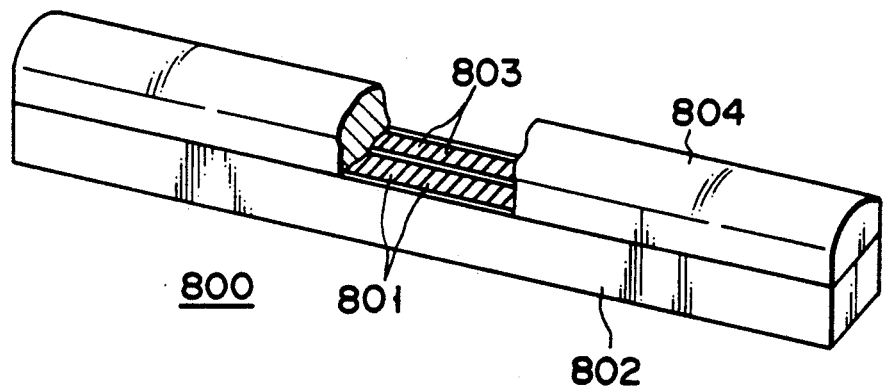
Figure 9:
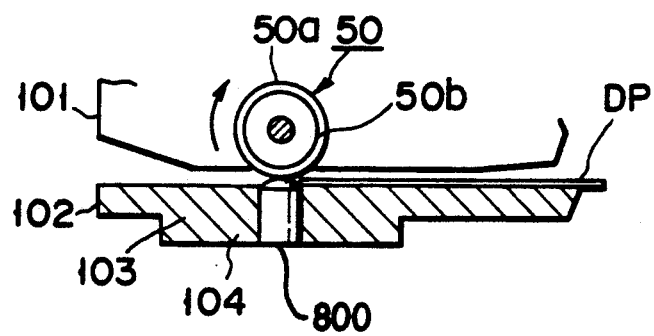
FIG. 9 is a diagrammatic view showing an image reading apparatus according to a third embodiment of the present invention.

FIG. 9 shows one form of denser image sensor. As shown in FIG. 8b, a denser image sensor 800 includes a plurality of very tiny light-receiving cells 801 and a substrate 802 where these cells are densely arranged in a linear fashion. The sensor further includes very tiny light-emitting elements 803 arranged on the substrate 802, in a linear fashion, near the line of cells 801, and serving as a light source. A transparent film 804 is formed over the cells 801 and functions both as a condensing lens and as a protective film. A document is brought into direct contact with the transparent film 804 to allow an image on the document to be read therefrom.

The denser image sensor 800 is provided in the slit 103a such that the top surface of the transparent film 804 is located flush with the top surface of the paper guide 102. The roller 50 is so located as to have a positional relation in which the enlarged section 50a contacts with the transparent film 804. By so doing, the document DP carried along the paper guide 102 is sandwiched between the transparent film 804 and the enlarged section 50a of the roller 50 and fed downstream through the conveying path, while being in firm contact with the transparent film 804, as the roller 50 is rotated.

The document DP on the transparent film 804 is illuminated with light originating from the light emitting element 803. The light which is reflected from the document travels past the transparent film 804 and reaches the light-receiving cell 801 where it is detected. In the absence of the document, a light beam reflected on the surface of the roller 50 is detected by the cells 801.

Figure 10:
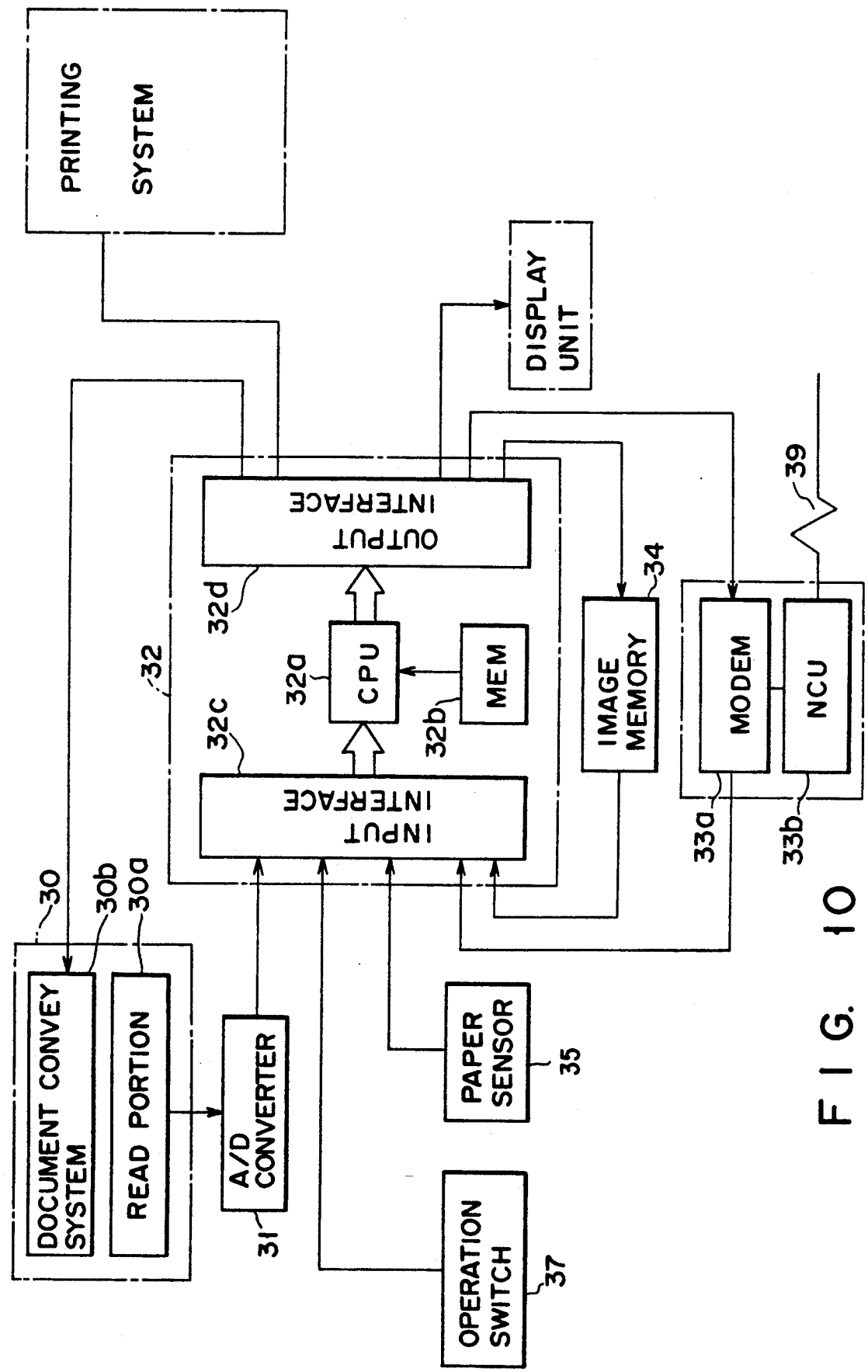
FIG. 10 is a block diagram showing a system of an image reading apparatus of the present invention, including a control system.

FIG. 10 is a block diagram showing an arrangement of a control system. The control system includes, for example, an image input device 30 having of a document convey system 30b adapted to control the rotation of the roller 50 and including the rollers 3, 4a and 6a and an image input device 30, such as a read portion 30a which is an imager system (a light-receiving sensor 107, light source 105, denser image sensor 800, etc.); an A/D converter 31 for converting an image detection signal which is output from the read portion 3a in the image input device 30 to digital data; an operation switch 37 for performing various operations; a paper sensor 35 for detecting that a document is inserted relative to a conveying system; an arithmetic operation controller 32 for performing various control operations of the system and for performing an arithmetic processing; an image memory 34 for holding image data; a system composed of a network control unit (NCU) 33b connected to a communication line 39 of a network and linked to the network and adapted to perform transmit/receiver control and a MODEM 33a for modulating and demodulating a signal; a printing system for receiving image data and providing a print output; a display unit for displaying various kinds of display; and so on.

The arithmetic operation controller 32 includes an input interface 32c, an output interface 32d, a processor (CPU) 32a, a memory composed of a ROM (read only memory) and RAM (random access memory), and so on. When the paper sensor 35 detects that a document is set, the controller 32 recognizes the detection and immediately drives the document convey system 30b to enable the document to be fed to the read portion 30a in the image input device 30. At the same time, the controller enables the light source 105 to be lit relative to the read portion 30a in the image input device 30, receives an image detection signal from the light-receiving sensor 107, and stores it, as a reference white-color level, in the memory 32b. The controller controls a lapse of time from the driving of the document convey system 30b following the detection of the document's setting and, since the document reaches the read portion 30a of the image input device in a predetermined period of time, discontinues the picking up of another reference white-color level from the time at which the aforementioned predetermined period of time lapses to the time at which the document moves past the "read portion (30a)" position. Further, the controller 32 performs the level correction processing of an image detection signal of the sensor 107, in accordance with the level of the reference white-color level signal, from the reaching of the "read portion (30a)" position by the document to the movement of the document past the read portion 30a, so that the white-color level is processed to its own desirable level. The controller 32 encodes the "level-corrected" image detection signal, stores it in the image memory 34, reads it out of the memory for transmission over an associated line and supplies it to the MODEM 33a. The MODEM 33a modulates data signal for transmission and supplies it to the 33b. The MODEM 33a receives a signal via the NCU 33b and supplies it to the controller 32. The NCU 33b sends or receives a call to or from an associated network and delivers a dial signal, etc., to a destination.

If, in the aforementioned arrangement of the facsimile apparatus including the rollers 3, 4a and 6a, the document is set relative to the document convey system 30b, this fact is detected by the paper sensor 35. The detection signal is supplied to the controller 32 and the controller 32 recognizes that the document is set relative to the document convey system.

When this is done, the controller 32 immediately drives the document convey system 30b to convey the document to the read portion 30a of the image input device. At this time, the controller turns the light source 105 on, receives an image detection signal from the sensor 107, picks up the image detection signal as a reference white-color level signal and stores it in the memory 32b. The controller supervises a lapse of time from the driving of the document convey system 30b following the detection of the document being set. Thus, the document reaches the "read portion 30a" position in a predetermined period of time. After the predetermined period of time, the controller discontinues the picking up of another reference white-color level signal until the document is moved past the "read portion 30a" position. Furthermore, the controller 32 performs the level correction processing of an image detection signal of the sensor 107, in accordance with the reference white-color signal level, from the time at which the document reaches the "read portion 30a" position to the time at which the document is moved past that position. At that time, the white-color level is so processed as to have a desirable level. The controller 32 encodes the level-corrected image detection signal, stores it in the image memory 34, reads it from the image memory 34, and supplies it to the MODEM 33a for transmission over a transmission line. Since the present invention relates to the image reading apparatus, any reference to a receiving system and the printing of reception data on a recording paper sheet is omitted for the sake of brevity.

Figure 11:
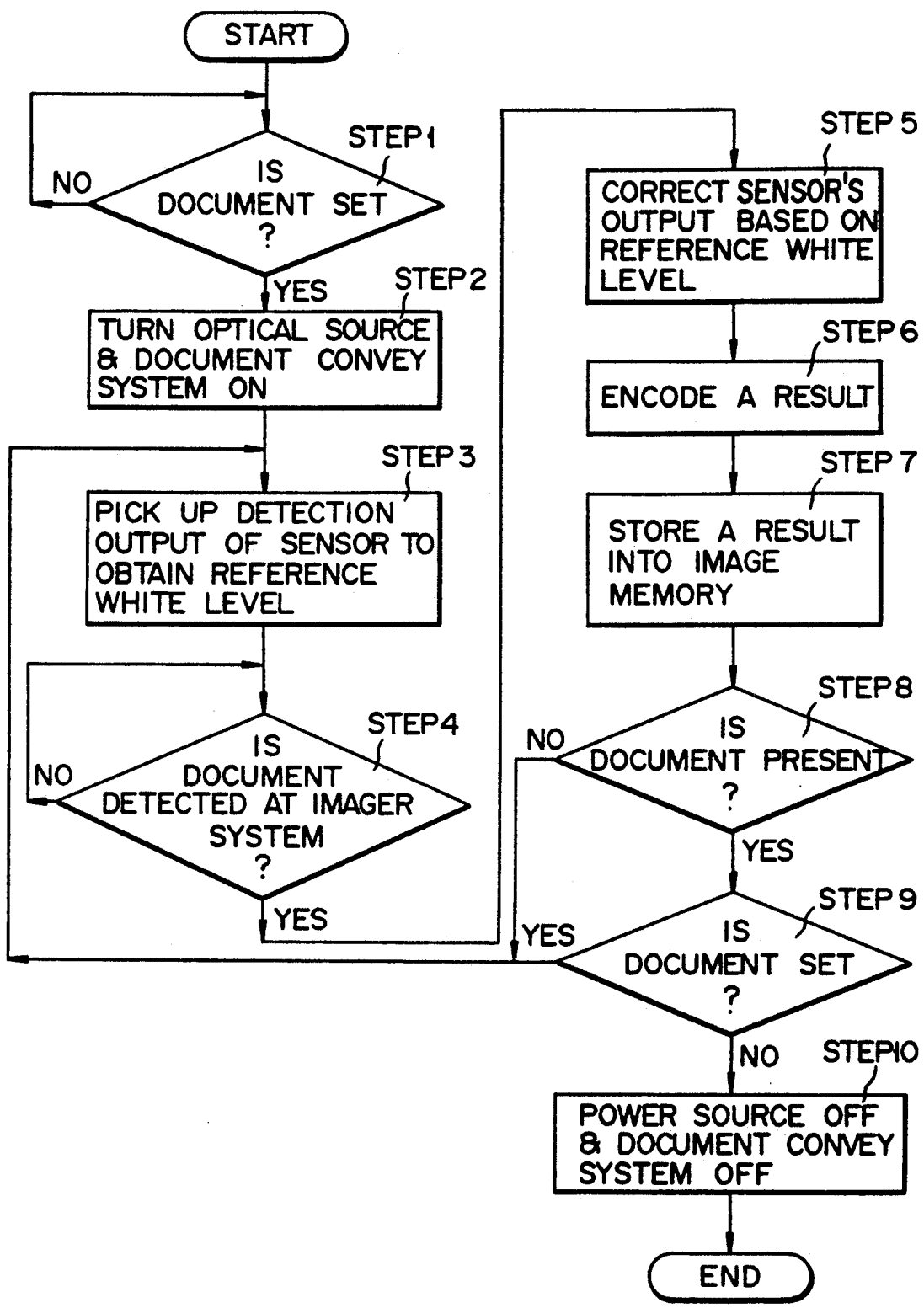
FIG. 11 shows one example of control by a CPU in a computation control circuit of the present invention.
Figure 12:
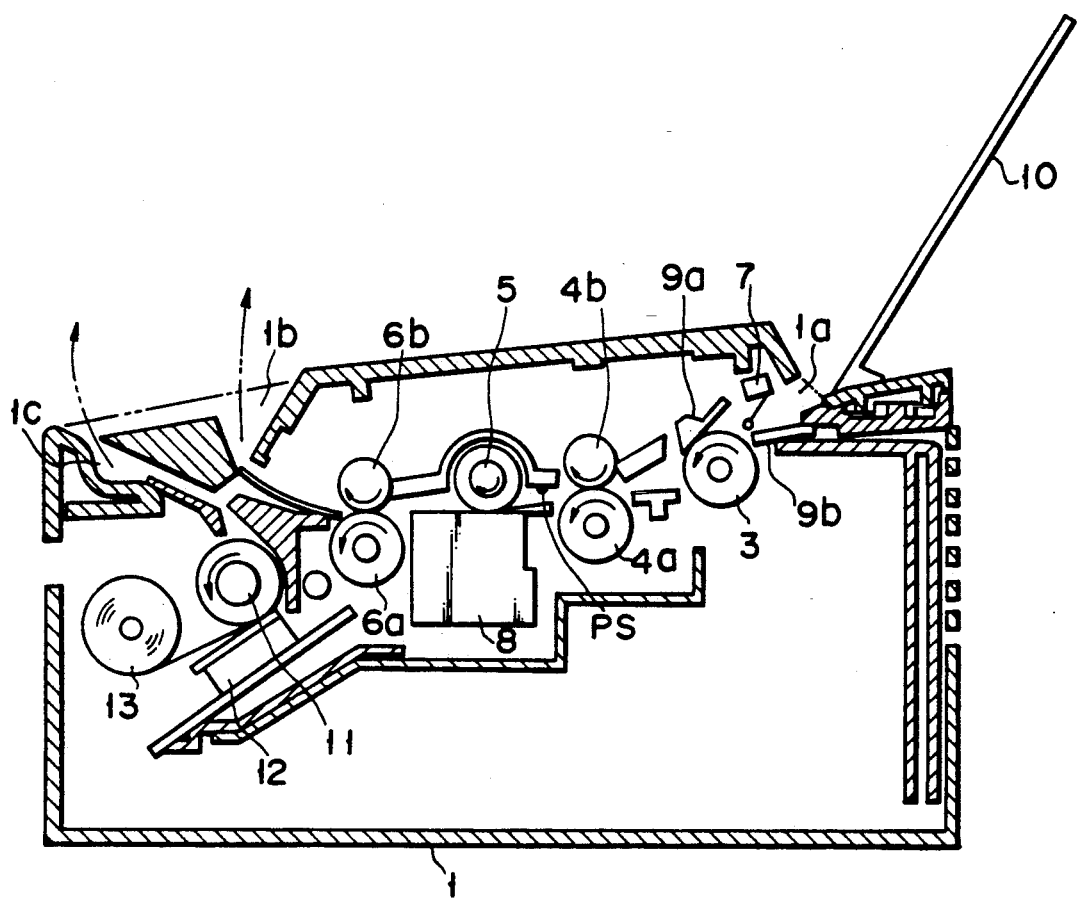
FIG. 12 is a view for explaining a basic arrangement of a conventional facsimile apparatus.

FIG. 11 is a flow chart showing a major flow of processing associated with the image reading apparatus thus explained. The present invention can be achieved by the CPU 32a in the controller 32 performing the function as indicated on the flowchart in FIG. 11.

Explanation will now be given below with reference to FIG. 11.

Step 1 determines whether or not a document is set relative to the document rest. This is determined according to the output of the paper sensor 35. The controller turns on the light source and the document convey system in step 2 when the sensor 35 detects that the document is set relative to the document rest. The controller picks up the detection output of the sensor at step 3 to obtain a reference white-color level. In step 4, the controller determines whether or not the document has reached the position of the imager system 8. For this check, a sensor for document detection, such as PS in FIG. 12, must be provided at a proper location upstream of the document convey path and in the proximity of the imager system. However, the imager system 8 may also have the function of detecting the presence or absence of a document or an arithmetic operation processing apparatus may have the function of detecting the presence or absence of a document on the basis of the detection output of a light-receiving element in an imager system.

When the result of the determination of step 4 indicates an arrival of the document at the imager system's position, then the controller, in step 5, corrects the sensor's output in accordance with a reference white-color level and, in step 6, encodes the correction-processed data. The resultant data is stored in the image memory in step 7. Step 7 is carried out during a time period in which the document is detected at the location of the imager system. When the document is not detected at the location of the imager system at step 8, the controller, step 9, checks the output of the paper sensor 35 corresponding to the set position of the document. While the document is being detected by the paper sensor 35, there are still subsequent sheet-like document or documents remaining, and control is returned back to step 3, and the above-described operations are repeated. If, as a result of the determination of step 9, no following document is detected by the paper sensor 35, the reading operation is ended, and the light source and document convey system are turned off in step 10.

These steps show a major process for reading a document by the CPU 32a in the controller 32a. It should be noted that the CPU 32a performs a document reading control operation and, at the same time, an image memory data transmission control operation. However, any detailed explanation of these is omitted for brevity's the sake of brevity.

According to the image reading apparatus of the present invention as set out above, the roller has a plurality of unenlarged white-color sections which do not contact with the transparent member (window) and the document and are kept clean and in a better condition over a prolonged period of time. Since the reference white-color level is obtained by directing light that originates from the light source to the unenlarged section of the roller and utilizing its reflected light, it is possible to gain a stable white-color level signal and, hence, to read out the document image with high stability. The roller requires fewer cleaning operations than conventional rollers and is easier to handle.

The present invention is not restricted to the aforementioned embodiments. Various changes or modifications of the present invention can be made without departing from the spirit and scope of the present invention. Although the document convey system has been explained as including the rollers, 3, 4a and 6a, only the roller 50 may be utilized to provide a document conveying function. In this case, documents cannot be separated from each other. Therefore, it is required that a reference white-color level be obtained just before the document set enters a read zone of the light-receiving sensor.

Furthermore, the present invention is not restricted to a facsimile apparatus and can be applied to any apparatus for conveying a document by a roller, reading it optically, and converting it to an image signal.

Although FIG. 11 shows control passing from steps 8 and 9 to step 3, the process may be modified so as to pass to step 4 in place of step 3.

Additional advantages and modifications will readily occur to those skilled in the art. Therefore, the invention in its broader aspects i not limited to the specific details, and representative devices, shown and described. Accordingly, various modifications may be made without departing from the spirit or scope of the general inventive concept as defined by the appended claims and their equivalents.

What is claimed is:

1. An image reading apparatus provided on a document conveying path to optically read the contents of a document being conveyed on the document conveying path and to obtain image signal information, comprising:
    a transparent stage provided on the document conveying path to allow a passage of light therethrough;
    a rotation roller for document conveyance which is provided on a first surface side of the stage to allow the document which is conveyed along the document conveying path to pass therethrough relative to the stage, the rotation roller including a plurality of unenlarged sections having a white surface and not contacting the stage and the document when the document is conveyed past the roller;
    a light source provided on an other surface side of the stage to illuminate the document conveying path through the stage;
    a light-receiving sensor provided on the other surface side of the stage and adapted to detect light which is directed from the light source to the path and reflected from a roller area on the path and convert document image information to an electric signal;
    a sensor for detecting the presence or absence of the document being conveyed toward the stage; and
    correction means for picking up, as a reference white level signal, an output signal which is obtained from the light-receiving sensor in an intervening time interval before the sensor for document detection detects the document and for level-correcting the output signal of the light-receiving sensor.

2. The image reading apparatus according to claim 1, wherein said unenlarged sections are a plurality of small-diameter sections of said roller and wherein an enlarged section of said roller is a remaining section or sections which contact with said stage and said document.

3. The image reading apparatus according to claim 1, wherein said unenlarged sections are a plurality of small-diameter sections of said roller and wherein an enlarged section of said roller is a remaining section or sections which contact with said stage and said document and have a gear-like contact surface.

4. The image reading apparatus according to claim 1, in which said roller is formed so as to have a fluted structure over a whole length thereof.

5. The image reading apparatus according to claim 1, in which said roller is a white-colored elastic member.

6. An image reading apparatus provided on a document conveying path to optically read the contents of a document being conveyed on the document conveying path and to obtain image signal information, comprising:
    a transparent stage provided on and across the document conveying path to allow light to pass therethrough;
    a rotation roller arranged on a first surface side of the stage to allow the document which is conveyed along the document conveying path to pass therethrough relative to the stage, the rotation roller including a plurality of unenlarged sections having a white surface and not contacting the stage and document when the document is conveyed past the roller;
    a light source provided on an other surface side of the stage to illuminate the document conveying path through the stage;
    a light-receiving unit including a plurality of very tiny light-receiving elements arranged as a dense array in one direction to convert light to an electric signal, the light-receiving elements being provided on the other surface side of the stage and arranged across the document conveying path to detect light directed from the light source to the path and reflected from a roller area on the path;
    a sensor for detecting the presence or absence of the document being conveyed toward the stage; and
    correction means for picking up, as a reference white level signal, an output signal which is obtained from the respective light-receiving elements in the light-receiving unit in an intervening time interval before the sensor for document detection detects the document and for level-correcting the output signal of the light-receiving element.

7. The image reading apparatus according to claim 6, wherein said unenlarged sections are a plurality of small-diameter sections of said roller and wherein an enlarged section of said roller is a remaining section or sections which contact with said stage and said document.

8. The image reading apparatus according to claim 6, wherein the unenlarged sections are a plurality of small-diameter sections of said roller and wherein an enlarged section of said roller is a remaining section or sections which contact with said stage and said document and have a gear-like contact surface.

9. The image reading apparatus according to claim 6, in which said roller is formed so as to have a fluted structure over a whole length thereof.

10. The image reading apparatus according to claim 6, in which said roller is a white-colored elastic member.

11. An image reading apparatus provided on a document conveying path to optically read the contents of a document being conveyed on the document conveying path and to obtain image signal information, comprising:

a light-receiving unit provided on the document conveying path and having a window made of a transparent member to allow a passage of light, a plurality of very tiny light-receiving elements provided inside the window to provide a dense array in one direction, and a light source for directing illumination light to an outside through the window, the light-receiving elements being provided across the document conveying path and the light-receiving unit being adapted to detect light which is directed from the light source toward the path and reflected from a roller area on the path.

a roller arranged opposite to a window position of the light-receiving unit to allow the document which is conveyed along the document conveying path to pass therethrough relative to the window, the roller including a plurality of unenlarged sections having a white surface and not contacting with the transparent member and document during the conveyance of the document past the roller;

a sensor for detecting the presence or absence of the document being conveyed toward the window; and correction means for picking up, as a reference white level signal, an output signal which is obtained from the light-receiving elements in the light-receiving unit in an intervening time interval before the sensor detects the document and for level-correcting the output signal of the light-receiving elements.

12. The image reading apparatus according to claim 11, wherein the plurality of unenlarged sections are a plurality of small-diameter sections of said roller and wherein an enlarged section of said roller is a remaining peripheral surface section or sections which contact with the transparent member and document.

13. The image reading apparatus according to claim 11, wherein the unenlarged sections are a plurality of small-diameter sections of said roller and wherein an enlarged section of said roller is a remaining peripheral surface section or sections which contact with the transparent member and document, the contact peripheral surface section having a gear-like structure.

14. The image reading apparatus according to claim 11, in which said roller is formed so as to have a fluted structure over a whole length thereof.

15. The image reading apparatus according to claim 11, in which said roller is a white-colored elastic member.

* * * * *

UNITED STATES PATENT AND TRADEMARK OFFICE
CERTIFICATE OF CORRECTION

PATENT NO. : 5,107,350
DATED : April 21, 1992
INVENTOR(S) : Shinichi Omori

It is certified that error appears in the above-identified patent and that said Letters Patent is hereby corrected as shown below:

On the title page Item [73]: change "Tokyo" to --Kawasaki--.

Claim 11, column 19, line 15, change "path." to --path;--.

Signed and Sealed this

Twelfth Day of October, 1993

Attest:

BRUCE LEHMAN

*Attesting Officer*   *Commissioner of Patents and Trademarks*